Patented July 25, 1950

2,516,230

UNITED STATES PATENT OFFICE 2,516,230

RESINS FROM CLAY TOWER POLYMERS

Edwin G. Marhofer, Lawrence, Kans., assignor to Phillips Petroleum Company, a corporation of Delaware No Drawing. Application May 24, 1948,
Serial No. 28,972

5 Claims. (Cl. 260—79.5)

This invention relates to solid resinous compounds. More specifically this invention relates to the preparation of solid resinous compounds from clay tower polymers.

Unrefined cracked distillates contain polyolefinic compounds which have potential gum-forming and color-forming properties and which are for that reason detrimental to the use of the distillate in finished stocks. A widely used process for the removal of such polyolefinic compounds is the clay treating process in which a cracked distillate stream, such as a normally liquid fraction having an end point of about 450 F., is contacted with an adsorptive clay and the aforesaid polyolefin compounds contained therein are selectively polymerized and subsequently removed as by-products. The polymeric by-products so produced are commonly referred to as "clay tower polymers" and are products of homopolymerization of polyolefins or of copolymerization of polyolefins with monoolefins and, in any case are more highly unsaturated than monoolefins. monoolefins contained in the distillate being treated are polymerized only in very minor amounts during the clay treatment.

Although the clay treating process can be conducted in the vapor, liquid or mixed phase, the mixed phase is preferable since such conditions minimize the loss of monoolefins to the clay tower polymer by-product. Temperature conditions of the clay treating process are generally in the range of from 250 to 750° F., and pressures vary from 50 to 600 p. s. i. The total clay tower polymer product occurs usually as a normally viscous liquid material; it chiefly comprises polyolefinic polymeric compounds in the molecular weight range of from 200 to 800. The normally solid fractions thereof comprise polyolefinic polymers having molecular weights as high as from 500 to 800, although the major portion of such solid fractions is in the molecular weight range of 300 to 500. The normally liquid fractions chiefly comprise polymeric materials formed by the homopolymerization of diolefins and by the copolymerization of diolefins and monoolefins. The general properties of clay tower polymers are shown in the following tabulation:

| | Total clay tower polymer |
|---|---|
| Gravity, °API @ 60° F. | 10–40 |
| Nonvolatile content, per cent [1] | 30–50 |
| Iodine number [2] | 190–250 |
| Viscosity @ 100° F., SUS [3] | 200–11,000 |
| Viscosity @ 200° F., SUS [3] | 40–150 |
| Flash point, °F. [4] | 185–325 |
| Fire point, °F. [4] | 205–345 |
| Pour point, °F. [5] | 20–60 |

[1] Per cent nonvolatiles as measured at 225° F. for a duration of 3 hours.
[2] Wijs-grams iodine that will react with 100 grams of sample.
[3] ASTM designation 446–39.
[4] ASTM designation D92–45.
[5] ASTM designation D-97.

The characteristics of clay tower polymers have long been known. For many years these polymers were considered to be of no value, and in many cases presented difficult disposal problems. More recently, clay tower polymers have become of potential importance as a source of valuable resinous solid materials, which are the relatively high melting fractions remaining when the normally liquid fractions of the clay tower polymers are separated therefrom. These resinous solids have especial utility as ingredients of varnishes and coating materials.

In the past, these solid resinous materials have been separated from clay tower polymers by known distillation methods and produced in yields usually in the range of from 30 to 50 per cent. However, the yields and characteristics of these resinous materials have been almost entirely dependent upon the specific stock charged to the clay treating process. The characteristics of the clay tower polymers depend to a large extent upon the hydrocarbon feed being processed and the process conditions maintained during the clay treatment, since they are by-products from large scale petroleum processing operations and are secondary thereto. The yield of the desired solid resin, being dependent on these factors, is therefore almost wholly beyond control. The more recently developed utilization of clay tower polymers as a source of resinous solid materials has made it desirable to provide a means of increasing the yield of resinous solids therefrom.

An object of this invention is to provide a method for the preparation of resinous materials from the polymeric by-product of a process for treating unrefined cracked distillates to remove undesirable polyolefinic compounds therefrom.

Another object is to provide a method for utilizing clay tower polymers as a source of solid resinous materials to an extent greater than that afforded by the physical separation of solid resinous materials thereupon.

It is yet another object to provide a continuous process for the production of solid resinous material from clay tower polymers.

Still another object is to provide an improved method for reacting polyolefinic polymeric hydrocarbons with sulfur in the presence of a catalyst.

Other objects will become apparent from the accompanying discussion and disclosure.

I have found that clay tower polymers can be reacted with sulfur in the presence of a catalyst to produce solid resinous compounds having physical properties similar to those of the solid resinous compounds inherently present in clay tower polymers. Such inherently present compounds comprise a source of valuable solid resinous materials, as aforesaid. Usually such materials are produced in yields varying from 30 to 50 weight per cent of the original clay tower polymer. In accordance with my invention, yields of such solid resinous materials vary from about 60 to substantially 100 weight per cent of the clay tower polymer charge. Although this increased yield is due in part to the weight of sulfur which has reacted with the polymer, it is due in a large part to the more efficient utilization of the original clay tower polymer material, i. e., the normally liquid constituents of the clay tower polymer are nearly completely reacted to produce the desired solid resinous product in accordance with my invention, whereas they are unreacted and are removed as such by distillation when solid resinous compounds are produced merely by physical separation as aforedescribed. By my process I have utilized as high as 77 per cent of the clay tower polymer charged whereas by physical separation methods, utilization of the clay tower polymer has been limited to within its nonvolatile content, which is usually within the range of 30 to 50 per cent. I have also found that when reacting sulfur with clay tower polymers in the presence of a catalyst of this invention, the formation of hydrogen sulfide as a by-product of the reaction is substantially less than that when conducting the reaction noncatalytically.

In the practice of a preferred form of my invention, a clay tower polymer, or any desired fraction thereof, is heated at a temperature in the range of about 250 to 500 F. in admixture with from 2 to 50 per cent of its weight of sulfur in the presence of a catalyst comprising mercaptobenzothiazole, or methylmercaptobenzothiazole, or a mixture of these two catalysts. Catalyst concentrations are preferably from about 0.1 to about 10 per cent, and more often in the range of from 0.5 to 2 per cent, based on the weight of the original clay tower polymer charged. Efficient agitation is maintained during the reaction. Reaction time is adjusted to give maximum yields when conducting the process at specific conditions of catalyst and temperature, and is usually within the limits of from 30 minutes to 10 hours.

Generally, I prefer to conduct the process batchwise under total reflux, and to recover the desired resinous product from the reaction mixture by conventional separation means, usually a vacuum distillation. However, my process can be conducted on a continuous basis. For example, preheated sulfur and clay tower polymer can be charged to a reaction zone in the presence of one or both of the aforesaid catalysts, and the total effluents therefrom passed to a vacuum distillation means from which the normally solid product would be recovered. Normally liquid components from the effluents can be recycled to either the preheating step or the reaction zone, in part or in whole, as desired.

The resinous materials of my invention are high melting solids, dark in color, have an acid number of substantially zero, are hydrocarbon soluble, and usually contain sulfur in an amount of from 5 to 20 per cent by weight, or sometimes higher, depending upon the initial concentration of sulfur in the reaction mixture.

The amount of sulfur utilized in my invention can be varied over a range, of from 2 to 50 per cent of the clay tower polymer charged. However, though concentrations even above 50 per cent can be used, I prefer sulfur concentrations more often in the range of 5 to 30 per cent.

Reaction temperatures are more often found to be satisfactory within the range of 250 to 350 F. Although the reaction proceeds more rapidly at higher reaction temperatures, the feasible uppermost temperature is 500 F., in view of the occurrence at temperatures thereabove, of excessive amounts of destructive cracking of the clay tower polymer charge stock. At temperatures below 250 F. the reaction becomes so slow as to be impracticable, even in the presence of the catalysts of their invention, due to the lack of commingling of reactants, which results from phase separation and precipitation of sulfur.

By means of my process I am able to produce yields of solid resinous materials equal in weight to from 50 to substantially 100 per cent of the weight of the clay tower polymer charged. The normally liquid constituents separated from the reaction product, usually on overhead product from the vacuum distillation thereof, comprise a very small proportion of the total product of the process of my invention, due to the efficient utilization of the clay tower polymer.

My process affords a greater utilization of clay tower polymer than has heretofore been possible in the preparation of solid resinous materials therefrom.

Advantages of this invention are illustrated by the following examples. Reactants and their proportions and other specific ingredients are presented as being typical and are not to be construed to limit the invention unduly.

*Example 1*

From the vacuum distillation of 400 parts by weight of clay tower polymer, 168 parts by weight of a resinous normally solid material was obtained as a kettle product. The hydrocarbon resinous product was obtained in a yield of 42 per cent, based on the weight of the original clay tower polymer charged, and had a softening point of 127° F.

*Example 2*

Four hundred parts by weight of the clay tower polymer of Example 1 is heated with one hundred parts by weight of sulfur for three hours at about 350° F. Considerable amounts (in excess of .25 parts by weight) of hydrogen sulfide are evolved. The conversion is not substantially greater than that in Example 1 when the weight of added sulfur is considered, and the quality of the product is inferior.

*Example 3*

400 parts by weight of the clay tower polymer of Example 1 was reacted with 100 parts by weight of sulfur in the presence of 10 parts by weight of mercaptobenzothiazole as a catalyst, for a duration of 3 hours at a temperature of about 350° F. The normally liquid constituents remaining in the reaction mixture at the termination of the 3-hour period were removed by vacuum distillation. A dark colored, resinous, normally solid material containing 20 per cent by weight of sulfur, and having a softening point of 138° F. was obtained as a kettle product in a yield of 97 per cent, based on the original clay tower polymer charged. This represents a utilization of 77 per cent of the original clay tower polymer.

*Example 4*

The process of Example 3 was repeated, charging 400 parts of clay tower polymer of Example 1, 40 parts of sulfur, and 4 parts of mercaptobenzothiazole. The resinous kettle product had a softening point of 137° F., a sulfur content of 10 per cent, and was obtained in a yield of 68 per cent, based on the original clay tower polymer charge. This represents a utilization of 61 per cent of the original clay tower polymer.

*Example 5*

The process of Example 3 was repeated, charging 400 parts of clay tower polymer of Example 1, 20 parts of sulfur, and 2 parts of mercaptobenzothiazole. The resinous kettle product had a softening point of 143° F., a sulfur content of 5 per cent, and was obtained in a yield of 57 per cent based on the original clay tower polymer charged. This represents a utilization of 54 per cent of the original clay tower polymer.

As will be evident to those skilled in the art, various modifications can be made or followed, in the light of the foregoing disclosure and discussion, without departing from the spirit or scope of the claims.

I claim:

1. A process for the preparation of a resinous normally solid material from the polymeric by-product of a process for clay treating an unrefined cracked distillate, comprising reacting such a polymeric by-product with sulfur at a temperature within the limits of 250 to 500° F. in the presence of a catalyst comprising one of the group consisting of mercaptobenzothiazole and methylmercaptobenzothiazole, and recovering from the reaction mixture a resinous normally solid product.

2. A process for preparing a resinous solid product from the polymeric by-product of a process for clay treating an unrefined cracked distillate, comprising reacting such a polymeric by-product with from 2 to 50 per cent of its weight of sulfur, at a temperature in the range of 250 to 350° F. for a duration of at least 30 minutes, and in the presence of from 0.1 to 10 per cent of a catalyst comprising one of the group consisting of mercaptobenzothiazole and methylmercaptobenzothiazole, said catalyst concentration based on the weight of clay tower polymer charged; and separating normally solid components from the reaction mixture and recovering a resinous normally solid product.

3. A process for preparing a resinous solid product from the polymeric by-product of a process for clay treating an unrefined cracked distillate, comprising reacting such a polymeric by-product with from 5 to 30 per cent of its weight of sulfur, at a temperature in the range of 250 to 350° F., for a duration of at least 30 minutes, in the presence of a catalyst comprising at least one of the group consisting of mercaptobenzothiazole and methylmercaptobenzothiazole; the concentration of said catalyst being in the range of 0.1 to 10 per cent based on the weight of the clay tower polymer charged; said clay tower polymer having a gravity in the range of from 10 to 40° API, nonvolatiles content in the range of from 30 to 50 per cent, an iodine number in the range of from 190 to 250, a viscosity at 200° F. of from 40 to 150 SUS, a flash point in the range of 185 to 325° F., and a pour point in the range of −20 to 60° F.; in a distillation step separating normally liquid constituents and normally solid constituents from the reaction mixture, and recovering from said distillation step as a product of the process, a dark colored, hydrocarbon soluble, resinous material having an acid number of substantially zero and a softening point within the range of 135 to 145° F.

4. A continuous process for the production of normally solid resins from the polymeric by-product of a process for clay treating an unrefined cracked distillate and sulfur which comprises preheating a mixture of such a polymeric by-product, sulfur and a catalyst selected from the group consisting of mercaptobenzothiazole and methylmercaptobenzothiazole, in which the weight ratio of sulfur to clay tower polymer is in the range of 1:50 to 1:2 and in which the weight ratio of catalyst to clay tower polymer is in the range of 1:1000 to 1:10, passing said preheated mixture to a reaction zone maintained at a temperature in the range of 250 to 500° F., at a rate such that the residence time in said reaction zone is in the range of 0.5 to 10 hours, passing the effluent from said reaction zone to a fractionation zone in which the normally liquid constituents are separated from the normally solid constituents, and recovering from said fractionation zone a normally solid resinous product having a softening point in the range of 135 to 145° F.

5. A process for preparing a resinous solid product from the total polymeric by-product of a process for clay treating an unrefined cracked distillate, comprising reacting such a total polymeric by-product with from 5 to 30% of its weight of sulfur, at a temperature in the range of 250 to 350° F. for a contact time of at least 30 minutes, and in the presence of from 0.1 to 10% of mercaptobenzothiazole as a catalyst, said catalyst concentration based on the weight of said polymeric by-product charged, and recovering from the reaction mixture a resinous normally solid product.

EDWIN G. MARHOFER.

REFERENCES CITED

The following references are of record in the file of this patent:

UNITED STATES PATENTS

| Number | Name | Date |
|---|---|---|
| 2,187,155 | Ingram | Jan. 16, 1940 |
| 2,309,692 | Chittick | Feb. 2, 1943 |
| 2,313,945 | Kellog | Mar. 12, 1943 |
| 2,378,030 | Olin | June 12, 1945 |
| 2,398,271 | Zimmer | Apr. 9, 1946 |

OTHER REFERENCES

Mayberry: Ind. and Eng. Chem., Ber. 1947, pages 166–167.